(12) United States Patent
Foster et al.

(10) Patent No.: US 11,532,977 B2
(45) Date of Patent: Dec. 20, 2022

(54) MAGNETIC LINEAR DRIVE DEVICE AND SYSTEM

(71) Applicant: SkyTran, Inc., Moffett Field, CA (US)

(72) Inventors: Clark B. Foster, Mission Viejo, CA (US); John Cole, Dana Point, CA (US); John Lee Wamble, III, Kenmore, WA (US)

(73) Assignee: SkyTran, Inc., Huntington Beach, CA (US)

( * ) Notice: Subject to any disclaimer, the term of this patent is extended or adjusted under 35 U.S.C. 154(b) by 274 days.

(21) Appl. No.: 15/737,261

(22) PCT Filed: Jun. 16, 2016

(86) PCT No.: PCT/US2016/037903
§ 371 (c)(1),
(2) Date: Dec. 15, 2017

(87) PCT Pub. No.: WO2016/205540
PCT Pub. Date: Dec. 22, 2016

(65) Prior Publication Data
US 2018/0175717 A1 Jun. 21, 2018

Related U.S. Application Data

(63) Continuation-in-part of application No. PCT/US2016/034167, filed on May 25, 2016.
(Continued)

(51) Int. Cl.
*H02K 49/10* (2006.01)
*H02K 41/03* (2006.01)
(Continued)

(52) U.S. Cl.
CPC ......... *H02K 41/033* (2013.01); *H01F 7/0247* (2013.01); *H02K 49/102* (2013.01); *B65G 54/02* (2013.01)

(58) Field of Classification Search
CPC ... H02K 49/102; H02K 49/104; H02K 49/106
See application file for complete search history.

(56) References Cited

U.S. PATENT DOCUMENTS

| 3,137,185 A | 6/1964 | Glicken |
| 3,331,257 A | 7/1967 | Gerber |

(Continued)

FOREIGN PATENT DOCUMENTS

| CN | 101656458 A | 2/2010 |
| JP | H02-076247 U | 6/1990 |

(Continued)

OTHER PUBLICATIONS

English translation generated by the International Searching Authority dated or about Sep. 16, 2016, for Japanese Patent Publication JPH 8-112733, published on May 7, 1996, listed as item #11 above.
(Continued)

*Primary Examiner* — Dang D Le
(74) *Attorney, Agent, or Firm* — Polsinelli PC

(57) ABSTRACT

Drive generator having a helical magnetic array. Additionally, a coupling portion is coupled to the drive generator and configured to be coupled to a vehicle. A drive member is configured to be at least partially located within the at least one drive generator, whereby the drive member is magnetically coupled to the at least one drive body. Furthermore, a prime mover is coupled to the drive member and configured to rotate the drive member, thereby imparting motion, when a portion of the drive member is located within the at least one drive generator, of the at least one drive generator relative to the drive member.

20 Claims, 9 Drawing Sheets

Related U.S. Application Data

(60) Provisional application No. 62/180,544, filed on Jun. 16, 2015.

(51) Int. Cl.
  *H01F 7/02* (2006.01)
  *B65G 54/02* (2006.01)

(56) References Cited

U.S. PATENT DOCUMENTS

| | | | |
|---|---|---|---|
| 5,106,375 | A | 4/1992 | Conero |
| 5,751,083 | A | 5/1998 | Tamura et al. |
| 5,913,401 | A | 6/1999 | Tamura et al. |
| 6,084,326 | A * | 7/2000 | Nagai ................. F16H 25/2418 310/103 |
| 7,501,723 | B2 | 10/2009 | Yasuda |
| 9,835,222 | B2 | 12/2017 | Berg et al. |
| 2005/0189830 | A1* | 9/2005 | Corbin, III ............. H02K 49/02 310/103 |
| 2007/0018512 | A1 | 1/2007 | Yasuda |
| 2009/0251258 | A1 | 10/2009 | Rhinefrank et al. |
| 2011/0271867 | A1 | 11/2011 | Liu |

FOREIGN PATENT DOCUMENTS

| | | |
|---|---|---|
| JP | H6-201012 A | 7/1994 |
| JP | H6-345358 A | 12/1994 |
| JP | H 8-112733 | 5/1996 |
| JP | H 09-196137 A | 7/1997 |
| JP | 2002-171745 A | 6/2002 |
| JP | 2007-057083 A | 3/2007 |
| JP | 2014-524229 A | 9/2014 |
| WO | WO 2015/070869 | 5/2015 |
| WO | WO 2016/204953 | 12/2016 |
| WO | WO 2016/205540 | 12/2016 |

OTHER PUBLICATIONS

International Search Report and Written Opinion, dated Aug. 31, 2016, 9 pages, from the International Searching Authority, for the corresponding International Application No. PCT/US2016/034167, listed as item #13 above.

International Search Report and Written Opinion, dated Sep. 16, 2016, 11 pages, from the International Searching Authority, for the corresponding International Application No. PCT/US2016/037903, listed as item #14 above.

Office Action (including short summary of English Translation) dated Jun. 3, 2019, for the corresponding Chinese Application No. 201680046346.2 in 20 total pages.

Office Action (including English Translation) dated Jun. 30, 2020, for the corresponding Japanese Application No. 2017-565200 in 16 total pages.

Office Action (including English Translation) dated Mar. 30, 2021, for the corresponding Japanese Application No. 2017-565200 in 10 total pages.

* cited by examiner

(12) United States Patent

MAGNETIC LINEAR DRIVE DEVICE AND SYSTEM

CROSS REFERENCE TO RELATED APPLICATIONS

This application is a U.S. National Stage Entry of PCT Application No. PCT/US2016/037903, filed Jun. 16, 2016, which is a continuation-in-part of International Patent Application No. PCT/US16/34167, filed on May 25, 2016, which claims the benefit of U.S. Provisional Patent Application No. 62/180,544, filed on Jun. 16, 2015, the contents of which are hereby incorporated by reference in their entirety.

FIELD

The subject matter herein is directed to a linear drive for linear conveyance.

BACKGROUND

Linear drive systems generally implement ball screw or linear motors having worm gears, linear induction, or linear synchronism motors. These linear drive systems can be implemented in industrial, commercial, or private settings. These systems require a motive force that is usually rotated in one direction, while the drive is in a different direction. These systems can be applied to an assembly line, a conveyor, or a people mover.

BRIEF DESCRIPTION OF THE DRAWINGS

Implementations of the present technology will now be described, by way of example only, with reference to the attached figures, wherein.

DETAILED DESCRIPTION

Figure 1:
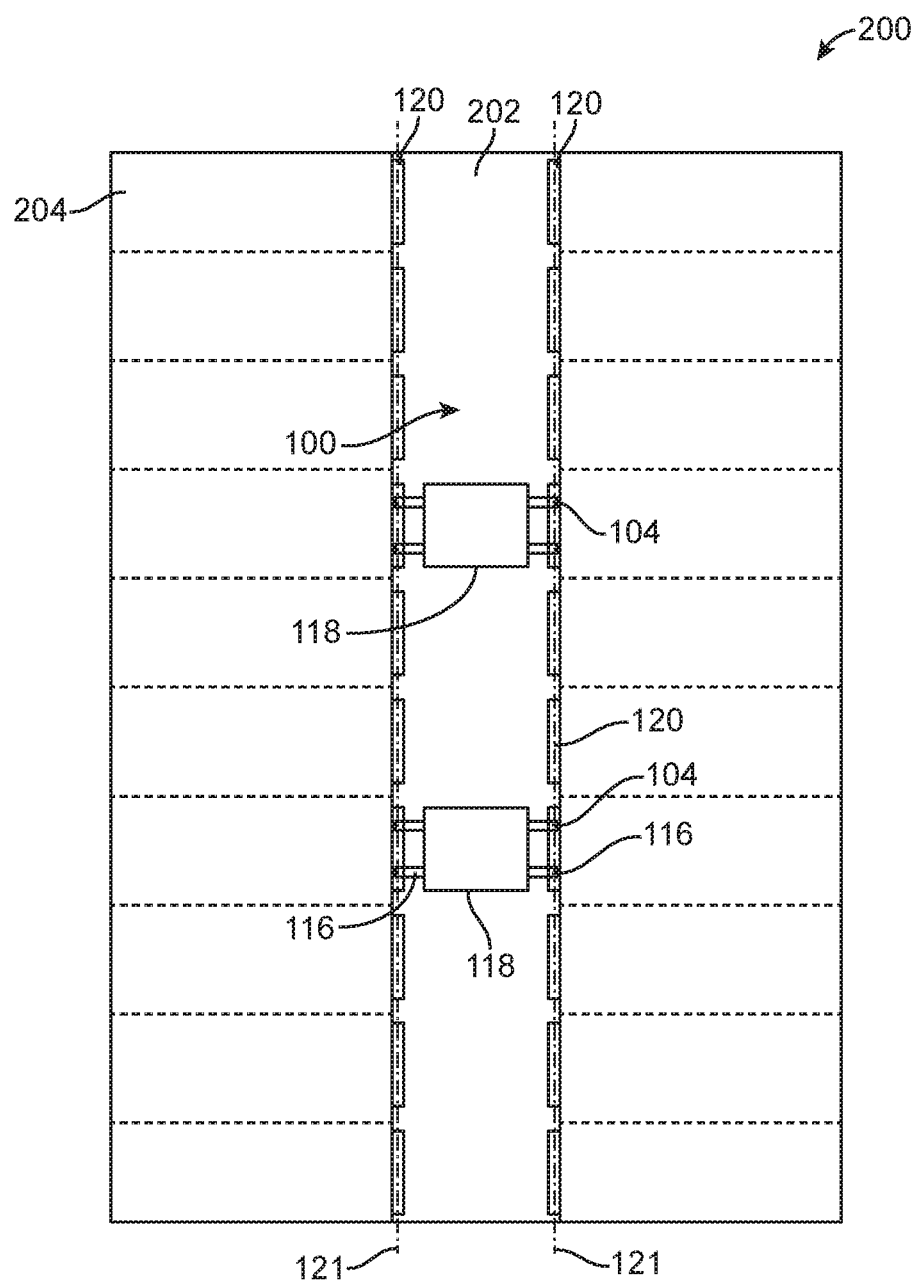
FIG. 1 is a diagrammatic view of a building having an example drive system disposed therein.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. "Drive force" refers to the force required to accelerate, maintain motion or decelerate one object with respect to another. As used herein "drive force" means a force substantially in line with the primary direction of travel, effected without mechanical contact between the two objects. A "drive generator" is a device that is configured to generate magnetic waves that interact with a drive member to drive a movable object with respect to a stationary object. A drive generator may also be referred to as a drive body as used herein.

Another term used herein is a "guideway." A guideway is a device or structure that provides for a path along which a driven member, such as a car, vehicle, catapult component, projectile, or bogie, can move along. The guideway can be formed by one or more drive members, or be independent of the drive members. A driven member refers to a device which is configured for travel along the guideway. The driven member can be at least partially enclosed, entirely enclosed or have only one surface upon which objects or persons can be placed. The driven member can be coupled to a bogie which is in turn coupled to the guideway. The bogie can be an integral component of the car or a separate component to which the car can be coupled. A bogie as used herein does not necessarily include wheels, but instead is configured for engagement with the guideway. The driven member can be a car or vehicle. The car or vehicle can be configured to transport goods, passengers or other items.

Another term used herein is "coupled." Coupled can refer to the linking or connection of two objects. The coupling can be direct or indirect. An indirect coupling includes connecting two objects through one or more intermediary objects. Coupling can also refer to electrical or mechanical connections. Coupling can also include magnetic linking without physical contact.

Another term used herein is a "magnetic source." A magnetic source is any material that naturally produces a magnetic field or can be induced to generate a magnetic field. For example, a magnetic source can include a permanent magnet, an electromagnet, a superconductor, or the like.

The present disclosure presents a drive generator that is configured to provide a motive force to a driven member. In at least one example, the drive generator comprises a helical magnetic array. The helical magnetic array can be configured to emit a helical magnetic flux towards a drive member. The drive member can be configured to be received within the helical magnetic array. The drive member can be configured to be partially within the helical magnetic array. Additionally, the helical magnetic array can be configured to traverse the drive member or the drive member can traverse the helical magnetic array. In at least one example, the driven member can be configured to traverse one or more drive members that collectively form a guideway. The guideway can be configured so that the driven member follows the path of the guideway.

The drive generator can also include a coupling portion that is configured to be coupled to a driven member. Upon rotation of either the drive member or helical magnetic array, the helical magnetic array is configured to traverse the drive member based upon a direction and speed of the rotation. Traverse as used herein does not refer to which component or element is moving, but rather that one is moving relative to the other so that one component is said to traverse the other. In at least one example, the helical magnetic array can be configured to rotate. The coupling portion can be configured to allow for rotation while providing substantial rigidity and structure to allow the driven member to traverse the drive member.

Additionally, the present disclosure includes a system that includes at least one drive generator having one or more of the features described in relation to drive generators. The system can also include a coupling portion if not already a part of the drive generator. Additionally, the system can include more than one drive generator. Furthermore, the system can include a drive member and a prime mover. The drive member is configured to be at least partially received within the at least one drive generator. In other examples, the helical magnetic array can be configured to fit within the drive member. The helical magnetic array is configured to emit a helical magnetic flux in the direction of the drive member.

In at least one example, a drive generator can be configured to provide motive force to a driven member. The drive generator can include a helical magnetic array. In at least one example, the drive generator includes at least one drive body having an inner surface and an outer surface. The helical magnetic array is configured to receive a drive member. In at least one example, the helical magnetic array includes a plurality of magnetic sources is arranged so as to form a helix. When a drive body is present, the helix is formed relative to the drive body. In an example, the plurality of magnetic sources are coupled to the inner surface of the drive body. In another example, the plurality of magnetic sources is coupled to the outer surface of the drive body. In yet another example, the plurality of magnetic sources can be within the drive body. When the plurality of magnetic sources is within the drive body, a groove can be formed to receive the plurality of magnetic sources in the drive body. In yet another example, the drive body can be formed around the plurality of magnetic sources. A coupling portion can be coupled to the drive body and the driven member. In another example, the coupling portion can be coupled to the drive member and the driven member.

The present disclosure also describes a drive system having a drive generator including at least one drive body having an inner surface and an outer surface. The at least one drive body can be in the form of a hollow member. In one example, the hollow member can be a cylinder. A plurality of magnetic sources are arranged so as to form a helix relative to the drive body. In at least one example, the plurality of magnetic sources is coupled to the inner surface. In another example, the plurality of magnetic sources is coupled to the outer surface. In yet another example, the plurality of magnetic sources can be within the drive body. A coupling portion can be coupled to the at least one drive body and a driven member. A drive member is configured to be at least partially located within the at least one drive body. When the drive member is at least partially located within the at least one drive body, the drive member is magnetically coupled to the at least one drive body. A prime mover can be coupled to the drive member and configured to rotate the drive member, thereby imparting motion of the at least one drive body relative to the drive member when a portion of the drive member is located within the at least one drive body. In another example, the prime mover can be coupled to the at least one drive body and configured to rotate the drive body, thereby imparting motion of the at least one drive member relative to the drive body. In other examples, both the drive body and the drive member can be configured to rotate. In at least one example, the drive member is configured to rotate but is fixed to maintain a general orientation relative to another structure or the ground. In other examples, the plurality of magnetic sources can be coupled to the drive member rather the drive body. Additionally, the orientation of the drive member relative to the drive body can be such that the drive body is within the drive member.

While the present disclosure is illustrated with respect to a drive system configured to impart a vertical drive force, the present disclosure can be implemented to impart a horizontal drive force, either vertical or horizontal drive forces, or any combination thereof. The coupling portion can allow the drive body to change positions to accommodate transitions from a vertical drive force to a horizontal drive force or vice versa, or allow motion at any angle relative to the vertical.

FIG. 1 illustrates a drive system 100 implemented within a building 200. The building 200 can have at least one shaft 202 formed therein. The drive system 100 can be configured to be disposed within the shaft 202 and provide a motive force to one or more driven members, also referred to herein as a vehicle, 118 within the shaft 202, thereby transitioning the driven member 118 between two or more building floors 204.

The drive system 100 can have a drive generator 102 having at least one drive body 104. The drive body 104 can have a plurality of magnetic sources (shown in FIG. 2) to engage with a drive member 120. The drive body 104 can be configured to receive at least a portion of the drive member 120. The drive member 120 can be configured to rotate about a longitudinal axis 121 to impart a motive force on the drive body 104, thereby causing the driven member 118 to move. The drive body 104 can be coupled to the vehicle by one or more coupling portions 116.

The drive system 100 can have more than one driven member 118 disposed within a shaft 202. For example, as shown, there are two driven members 118. The drive system 100 can have two driven members 118 each having one or more drive bodies 104. When there are more than one driven members 118, each of the respective driven members 118 can be configured to service differing groups of building floors 204, either simultaneously or independently. In one example, the upper driven member 118 can be restricted from movement to the floors serviced by the lower driven member 118. In other examples, the upper driven member 118 and lower driven member 118 can service the same floors, and a storage area can be made on the top and bottom of the shaft. In alternative examples, the shaft can allow for horizontal movement as well as vertical movement. For example, a floor can be configured to house a mechanical switch over to allow the vehicle to move in a horizontal as well as a vertical direction. This can include having a horizontal receiving space formed in the building. In at least one example, one or more of the drive member 120 and corresponding drive body 104 can be configured to rotate to allow for the horizontal movement. In other configurations, the vehicle can be configured to cooperate with an additional mechanical structure that provides for horizontal movement.

In at least one example, the present technology can be configured for horizontal conveyance. When configured for horizontal conveyance, the describe technology applies except that the direction of movement is different. Horizontal conveyance can be implemented to allow for assembly lines, catapults and other mechanisms. Additionally, as indicated herein, the technology can be implemented where there is a component of both horizontal and vertical movement. This can be achieved by have angled portions that allow for both horizontal and vertical movement relative to a floor or ground. In other examples, the technology can include a mixture of horizontal, vertical and angled components.

The drive system 100 can have a plurality of drive members 120 of varying length. As can be appreciated in FIG. 1, the drive system 100 has an upper driven member 118 disposed within the shaft 202 and configured to service a group of upper level building floors 204. The drive system 100 also has a lower driven member 118 disposed within the shaft 202 and configured to service one or more lower building floors 204. The lower driven member 118 has a single drive member 120 extending across multiple building floors 204. In other examples, the present technology can be implemented so that the vehicle traverses a number of floors faster than other floors, this is often called an express mode. In this configuration, certain floors can be bypassed. In this configuration, additional drive generators and drive members can be implemented to only operate in the express configuration to allow for a greater speed.

Figure 2:
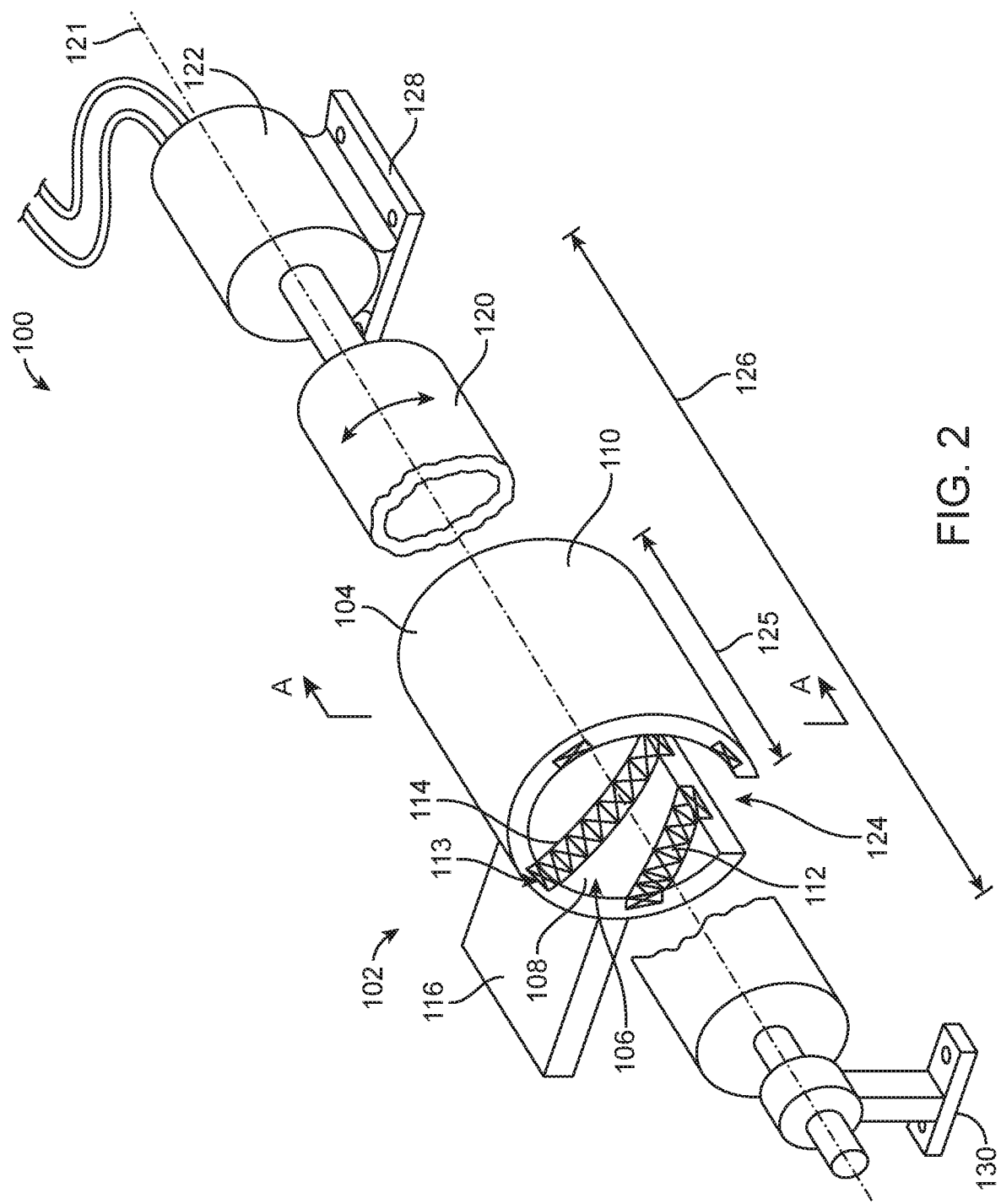
FIG. 2 is an isometric view of an example drive system in accordance with the present disclosure.

FIG. 2 illustrates a drive system 100 configured to impart a drive force. The drive system 100 includes a drive generator 102 having a helical magnetic array 113. The helical magnetic array can include a plurality of magnetic sources 112. In at least one embodiment, the helical magnetic array can be coupled to or be a part of at least one drive body 104. The at least one drive body 104 can be in the form of a hollow member 106. In one example, the hollow member 106 is a cylindrical member. In other examples, the interior of the hollow member 106 can be shaped to receive a substantially cylindrical object while the exterior of the hollow member 106 can be another shape, for example a square, triangle or other polygon in cross section.

The at least one drive body 104 can have an inner surface 108 and an outer surface 110. In at least one example, the plurality of magnetic sources 112 can be helically arranged relative to the at least one drive body 104 and be coupled to the inner surface 108. In other examples, the plurality of magnetic sources 112 can be formed within the drive body 104 or mounted within a groove formed on the drive body 104. In yet other examples, the plurality of magnetic sources 112 can be coupled to the outside of the drive body 104. In other examples, the drive body 104 can be eliminated and a helical magnetic array 113 can be coupled to the coupling portion 116. In at least one example, the helical magnetic array 113 can include a plurality of magnetic sources 112. The examples as given herein are in relation to a plurality of magnetic sources 112 coupled to the inner surface 108 of the drive body 104, but any of the above configurations can be implemented. Cross section views are also provided of some of the examples in FIGS. 4A-D, below.

The plurality of magnetic sources 112 can form a helix 114 disposed around the inner surface 108 of the drive body 104. The plurality of magnetic sources 112 can be either permanent magnets, electromagnets, or a combination thereof. In at least one example, the helix 114 is a double helix having two rows of magnetic sources 112 helically arranged on the inner surface 108. In other examples, the helix 114 is a quadruple helix having four rows of magnetic sources helically arranged around the inner surface 108. In other instances, the helix 114 can be any number of rows of magnetic sources, in multiples of two, helically arranged along the length 125 of the inner surface 108. The longitudinally extending length 125 can be substantially parallel to a direction of travel of the at least one drive generator 102, and the drive member 104 is configured to be rotated about a longitudinal axis 121. Alternatively, the drive member 104 has a longitudinally extending length 125 substantially parallel to a direction of travel of the drive body 104.

Figure 3:
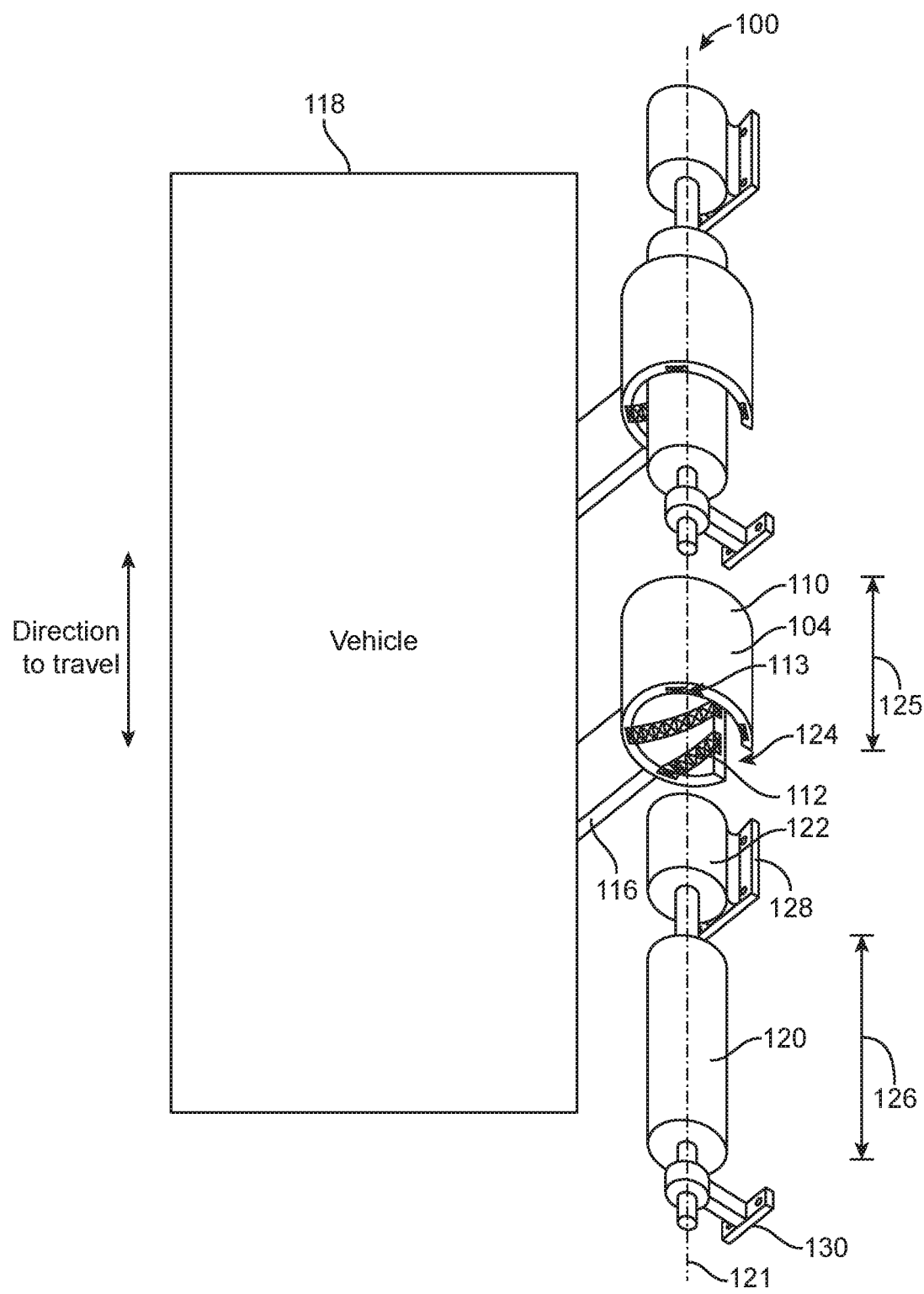
FIG. 3 is a isometric view of an example drive system coupled with a vehicle in accordance with the present disclosure.

The drive body 104 can have a coupling portion 116 being coupled to the hollow member 106 and a driven member 118 (shown in FIG. 3). The coupling portion 116 can be a flange or other member disposed between the drive body 104 with the driven member 118. The coupling portion 116 can also pivotally couple the drive body 104 and the driven member 118 depending on the arrangement of the drive system 100. The pivotal coupling portion 116 can allow the drive body 104 to change orientations relative to the driven member 118, thereby changing the orientation of the drive force and direction of travel. In other examples, the coupling portion 116 can be fixed and non-pivotable. Additionally, the coupling portion can be fixed in the direction of travel but compliant in other directions. As indicated above, the coupling portion can be configured to allow for rotation of the drive body 104 or helical magnetic array 113, where a drive body 104 is not present.

The drive system 100 also includes a drive member 120 configured to be at least partially located within the at least one drive body 104 when the drive member 120 is magnetically coupled to the at least one drive body 104. The drive member 120 can be a substantially cylindrical tube configured to rotate within the drive body 104. The drive member 120 can also be a substantially solid substantially cylindrical element. In at least one example, the drive member 120 is a substantially cylindrical aluminum alloy tube.

Rotation of the drive member 120 received within the drive body induces magnetic flux between the plurality of magnetic sources 112 and the drive member 120 and the induced magnetic flux can generate a drive force propelling the drive body 104 along a length 126 of the drive member 120. Rotation of the drive member 120 can be about a longitudinal axis 121. In at least one implementation, all of the drive members are configured to rotate about the same longitudinal axis 121. Rotation of the drive member 120 in a clockwise direction can generate travel in a first direction and rotation of the drive member 12 in a counterclockwise direction can generate travel in a second direction, opposite the first direction. The direction of travel induced by rotation in the clockwise or counterclockwise direction is determined by the angle θ of the helix 114 relative to the length 126 of the drive member 120. (Shown in FIG. 5). The direction of travel induced by the drive force can be changed, reversed, or altered by adjusting the rotation of the drive member 120. The drive force can be increased or reduced by increasing or decreasing the speed of rotation of the drive member 120. Faster rotation of the drive member 120 can generate a larger drive force, thereby propelling the driven member 118 at a higher rate of speed. Reversing the rotation direction of the drive member 120 can reverse the direction of travel of the drive body 104. Additionally, slowing the rotation or reversing rotation of the drive member 120 can act to brake or reduce the speed of the driven member 118 during travel. In other instances, the ability to move in the reverse direction can be used to produce energy. For instance, in the example of an elevator, the drive member 120 would not need to be powered to allow for descent. Rather, the drive member 120 would simply produce power as it falls. Additionally, the ability to work in either direction can allow for the generation of power.

The drive system 100 can also include a prime mover 122 configured to rotate the drive member 120. The prime mover 122 can be a servo motor coupled with the drive member 120 and configured to impart rotation. In other examples, the prime mover 122 can be a gear arrangement, turbine arrangement, belt arrangement, magnetic arrangement, or any other method for imparting motion on the drive member 120. The prime mover 122 and a prime mover mounting base 128 can be disposed at one end of the drive member 120. A mounting bracket 130 configured to receive the opposing end of the drive member 120. The prime mover 122, prime mover mounting base 128, and mounting bracket 130 can each be shaped so as to be received within the drive body 104. In other examples, the prime mover 122 can connected to the drive member 120 through one or more components such that the prime mover 122 is offset from the drive member 120.

The drive body 104 can have a slot 124 formed therein and extending a length of the hollow member 106. The slot 124 can receive a portion of the prime mover mounting base 128 and/or the mounting bracket 130 allowing the drive body 104 to pass over at least one end of the drive member 120. The slot 124 can allow the drive body 104 to pass over a drive member 120. When the prime mover 122 is offset relative to the drive member, the slot 124 can also allow for a driving mechanism that would couple the prime mover 122 to the drive member 120.

FIG. 3 illustrates a drive system 100 configured to impart motion on a drive body 104 coupled to a driven member 118. The scale of the drive system 100 can be as shown or in a typical configuration, the scale of the drive system 100 relative to the vehicle 118. For example, the drive system is shown to explain the components of the drive system rather than show the scale of the components relative to one another and the vehicle 118.

The driven member 118 can have more than one drive body 104 coupled therewith. While the illustrated example displays two drive bodies 104, the driven member 118 have one, three or any number of drive bodies coupled thereto. The driven member 118 can have four drive bodies with two disposed on opposing sides. The slot 124 formed along the length of the drive body 104 can allow a drive members 120 to be received within a drive body 104 as the drive system 100 imparts motion on the driven member 118. As the driven member 118 travels, the slot 124 can allow one drive member 120 to exit the drive body 104 and an adjacent drive member 120 to be received in the drive body 104.

In a vertical displacement arrangement, the vehicle 118 can be an elevator car or transport vessel having one or more drive bodies 104 coupled therewith. Each drive body 104 can receive at least a portion of the drive member 120. A guideway can be formed by a plurality of drive members 120 along which the vehicle 118 can travel. Each drive member 120 of the guideway can have a corresponding prime mover 122 and capable of independent rotation relative to adjacent drive members 120. In other examples, one prime mover 122 can be configured to drive more than one drive member 120. In examples where more than one drive member 120 is coupled to a single prime mover 122, a transmission can be implemented to allow the drive member 120 to rotate independently from any other drive member coupled thereto.

The drive members 120 can be rotated as the vehicle 118 and drive bodies traverse the portion of the guideway and remain stationary when the vehicle is not traversing the adjacent portion of the guideway. A guideway having a plurality of drive members 120 can allow extended displacement while maintaining energy efficiency by only rotating adjacent drive members 120, while preventing extended length 126 drive members 120 from rotating. In the vertical displacement arrangement, the drive system 100 can be operated in reverse. The vehicle 118 can displace downward due to a gravitational force, thereby turning the drive members 120 by magnetic coupling causing the prime mover 122 to produce electrical power. As illustrated the drive members 120 are configured to rotate about a longitudinal axis 121.

The guideway formed by a plurality of drive members 120 can allow more than one vehicle 118 to traverse the same guideway independent of other vehicles 118. Two or more vehicles 118, or elevator cars, can be disposed within a single elevator shaft and configured to traverse the guideway. In one example, the vehicles 118 cannot pass each other, but one vehicle 118 can traverse a portion of the guideway while the other vehicle traverses a different section of the guideway.

In at least one example, the vehicle 118 is an elevator car configured to be received within an elevator shaft having a guideway disposed along the length of the shaft. Two or more elevator cars can be disposed within a single elevator shaft. A first vehicle 118 can be configured to service a first group of floors (for example, floors 1-20) and a second vehicle 118 can be configured to service a second group of floors (for example, floors 21-40). Multiple vehicles within the same elevator shaft can be beneficial to increase capacity and reduce elevator footprints. When configured in this arrangement, one or more vehicles are configured to provide express service to floor 21 or there is an internal connection between floors 20 and 21.

The drive system 100 can independently rotate the necessary drive members 120 to move the first vehicle, the second vehicle, or both. Independent rotation of individual drive members 120 can allow the first vehicle and the second vehicle to move in different directions independent of one another.

Figure 4A:
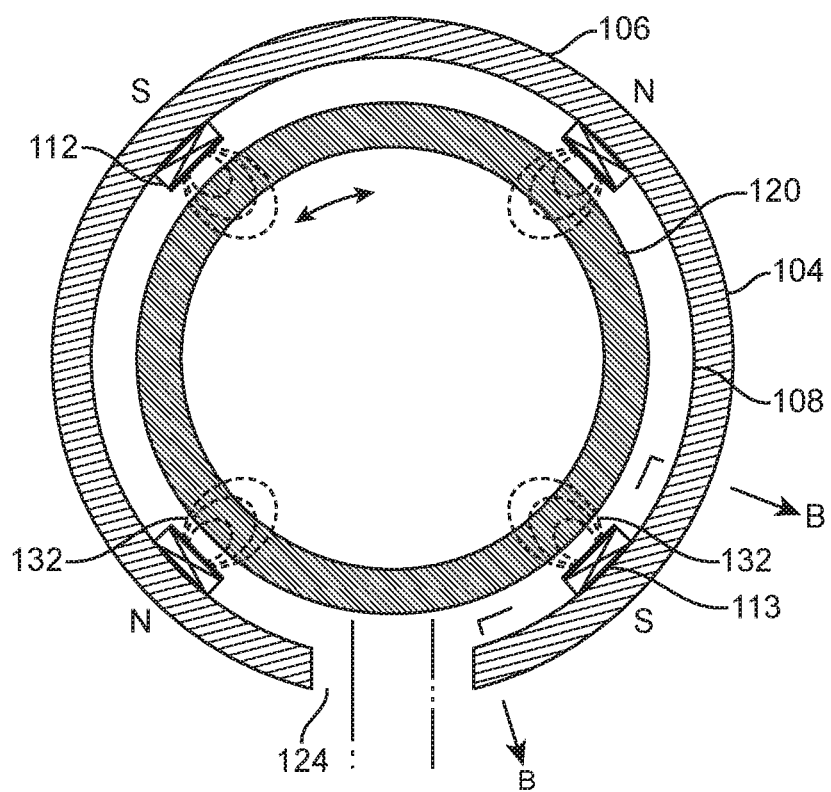
FIG. 4A is a cross-section view along line A-A of the drive system of FIG. 2.

FIG. 4A illustrates a cross section view of a drive body 104 and a drive member 120 received therein. The drive member 120 can be received substantially within the drive body 104. Additionally, a helical magnetic array 113 is illustrated and configured to magnetically engage the plurality of magnetic sources 112 disposed on the inner surface 108 of the drive body 104. The plurality of magnetic sources 112 can be arranged in a quadruple helix providing four rows of magnetic sources extending the length of the inner surface 108 of the drive body 104. The four rows of magnetic sources can have two rows of a first polarity and two rows of a second polarity, alternatively disposed around the inner surface 108. As can be appreciated in FIG. 4A, the plurality of magnetic sources 112 have two positive polarity and two negative polarity magnetic sources alternatively disposed around the inner surface 108.

Rotation of the drive member 120 relative to the drive body 104 can induce magnetic flux 132 between the plurality of magnetic sources 112 and the drive member 120. The magnetic flux 132 imparts motion on the drive body 104 relative to the drive member 120 via the drive force. The drive member 120 can be a substantially cylindrical tube. In at least one example, the drive member 120 is formed from an aluminum alloy.

The plurality of magnetic sources 112 can be coupled to the inner surface 108 of the drive body 104 or flush mounted within the inner surface 108 of the drive body. (Shown in FIG. 4B). The drive body 104 can be any shape and have a hollow member 106 shaped to receive a correspondingly shaped drive member 120. The drive body can be square, rectangle, or any polygon and having a hollow member 106 having a shape corresponding to the drive member 120 configured to be received therein.

The hollow member 106 can be shaped to correspond with the drive member 120. The hollow member 106 can be square, rectangle, or any polygon configured to receive the drive member 120. The hollow member 106 can alternatively be any polygon independent of the shape of the drive member 120 and have flanges disposed between the plurality of magnetic sources 112 and the inner surface 108 of the hollow member 106. The flanges can arrange the plurality of magnetic sources 112 to correspond to the shape of the drive member 120.

In at least one example, the hollow member 106 has a substantially rectangular shaped inner surface 108 and is configured to receive a substantially cylindrical drive member 120. Flanges can couple the plurality of magnetic sources 112 in the helical arrangement irrespective of the space of the hollow member 106.

Figure 4B:
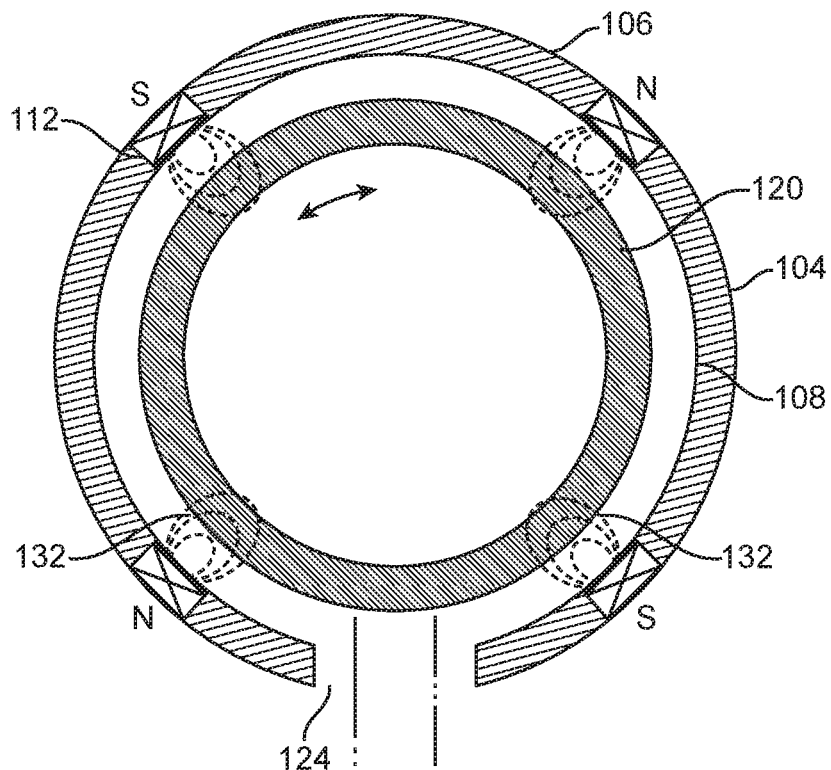
FIG. 4B is a cross-section of an alternative example of the system shown in FIG. 4A.

FIG. 4B is similar to the cross section illustrated in FIG. 4A. FIG. 4B illustrates a cross section view of a drive body 104 and a drive member 120 received therein. The plurality of magnetic sources 112 is disposed within the drive member 120. The plurality of magnetic sources 112 as can be arranged in any orientation that is desired to produce the helical magnetic flux.

Figure 4C:
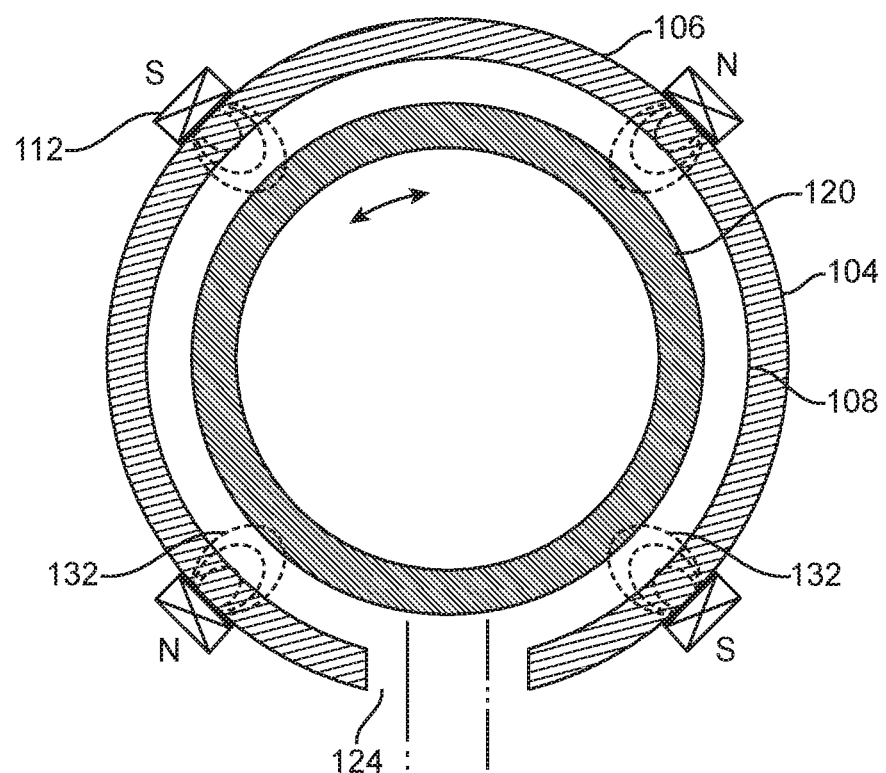
FIG. 4C is a cross-section of another alternative example of the system shown in FIG. 4A.

FIG. 4C is similar to the cross section illustrated in FIG. 4A. FIG. 4C illustrates a cross section view of a drive body 104 and a drive member 120 received therein. The plurality of magnetic sources 112 is disposed on an outer surface 110.

Figure 4D:
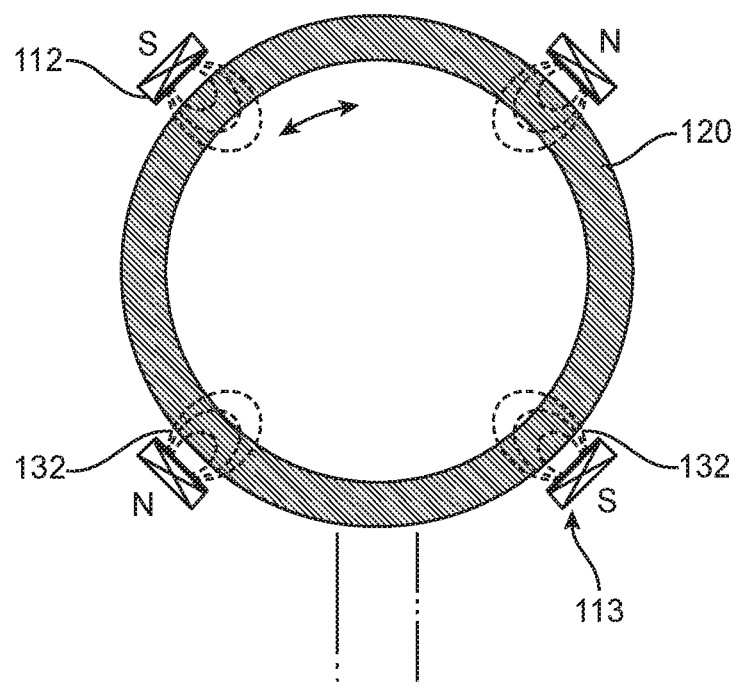
FIG. 4D is a cross-section of another alternative example of the system shown in FIG. 4A.

FIG. 4D is similar to the cross section illustrated in FIG. 4A. FIG. 4D illustrates a cross section view of a helical magnetic array 113, without the presence of the drive body 104. In this configuration, the helical magnetic array 113 is such that it provides for increased air flow to the helical magnetic array 113 and the drive member 120. In other embodiments, the drive body 104 can be perforated to allow for increased air flow to the helical magnetic array 113 and the drive member.

Figure 5:
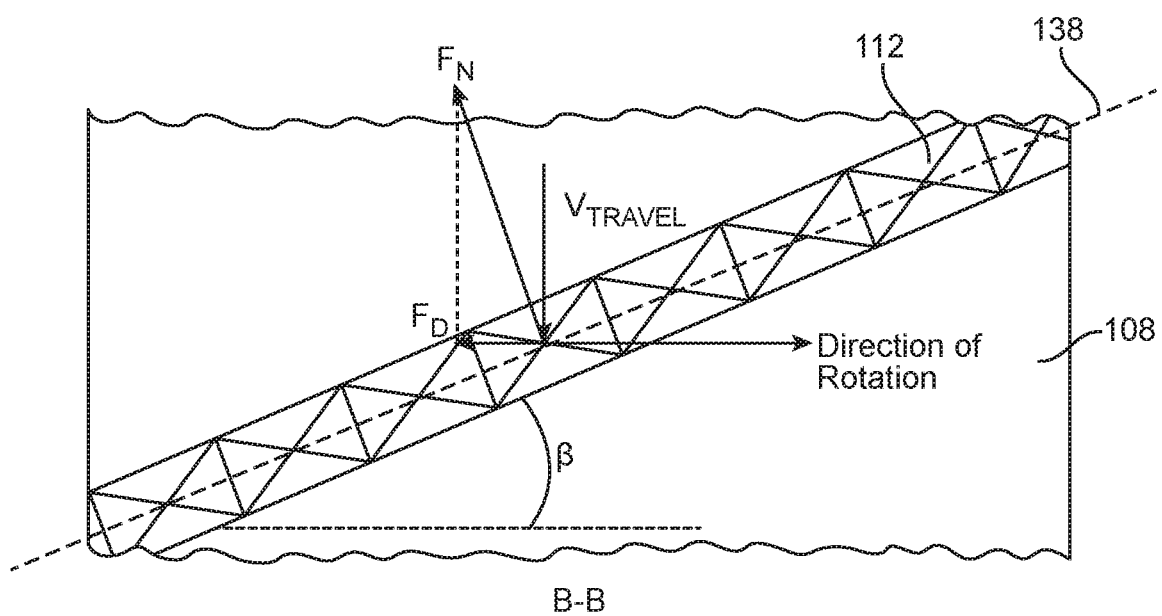
FIG. 5 is a cross section view along line B-B of the drive system of FIG. 4A.

FIG. 5 illustrates a cross section view of the inner surface 108 of the hollow member 106. The plurality of magnetic sources 112 can be helically arranged around the inner surface 108 of the hollow member 106. The helical arrangement can be at angle $\beta$ relative to a longitudinal axis of the hollow member 106. The helical arrangement can be formed at any angle $\beta$, but preferably between 15 and 75 degrees. The helical arrangement produces magnetic flux between the plurality of magnetic sources 112 and the drive member 120, thereby imparting a motive force on the drive body. As angle $\beta$ approaches zero (0) degrees, motive force on the drive body approaches zero, such that at angle $\beta$ zero (0) degrees, the motive force on the drive body is zero.

The drive system 100 (illustrated in FIG. 3) can cause an electrical magnetic flux to form within at least a portion of the hollow member 106 when the drive body 104 moves relative to the drive member 120. The electrical magnetic flux can be dependent upon an angle ($\beta$) between a direction of rotation of the at least one drive body 104 relative to the at least one drive member 120 and the axis 138 of the plurality of magnetic sources 112 of the drive body 104. Increasing/decreasing the rotational speed of the drive member 120 can increase/decrease vector $V_{TRAVEL}$ and reversing the rotational direction of the drive member 120 can generate a vector $V_{TRAVEL}$ opposite the original $V_{TRAVEL}$.

As illustrated in FIG. 5, the plurality of magnetic sources 112 is shown in relation to a drive body 104. As shown the plurality of magnetic sources 112 moves with a velocity ($V_{TRAVEL}$) in the direction of travel. The normal velocity ($V_N$) of the magnetic source 112 can be calculated as $V_N=\sin(\beta)*V_{TRAVEL}$, where $\beta$ is the angle formed between the travel direction and axis 138 of the helix 114. For a given configuration of the magnetic source 112, it is possible to derive a normal velocity constant $K_{FN}$ and peak velocity $V_{PEAK}$. Once the values of $K_{FN}$ and $V_{PEAK}$ are known, it is possible to determine the normal force ($F_N$) using the following formula, $F_N=K_{EN}*(V_N*V_{PEAK})(V_N^2+V_{PEAK}^2)$. Once the normal force ($F_N$) has been calculated it is possible to determine drag force ($F_D$) using the following formula $F_D=\sin(\beta)*F_N$. Under some typical operating conditions, the value of angle $\beta$ is small so $F_D$ is a small fraction of $F_N$. Also under some typical operating conditions, the values of $V_N$ is much less than the value of $V_{PEAK}$ so $F_N$ is approximately, $K_{FN}*V_N$, and $F_D$ is approximately $\sin(\beta)*\sin(\beta)*K_{FN}*V_{TRAVEL}$. Thus, it can be understood that a low angle of attack ($\beta$) increases the lift-to-drag ratio.

The helix 114 can have a clockwise orientation or a counter clockwise orientation thereby determining the direction of the drive force and resulting motion induced by rotation of the drive member 120. A helix 114 having a clockwise orientation can impart a drive force in a first direction when the drive member 120 is rotated in clockwise, and in a second direction opposite the first direction when the drive member 120 is rotated counterclockwise. A helix 114 having a counterclockwise orientation can impart a drive force in a second direction when the drive member 120 is rotated in clockwise, and in a first direction opposite the first direction when the drive member 120 is rotated counterclockwise.

Figure 6:
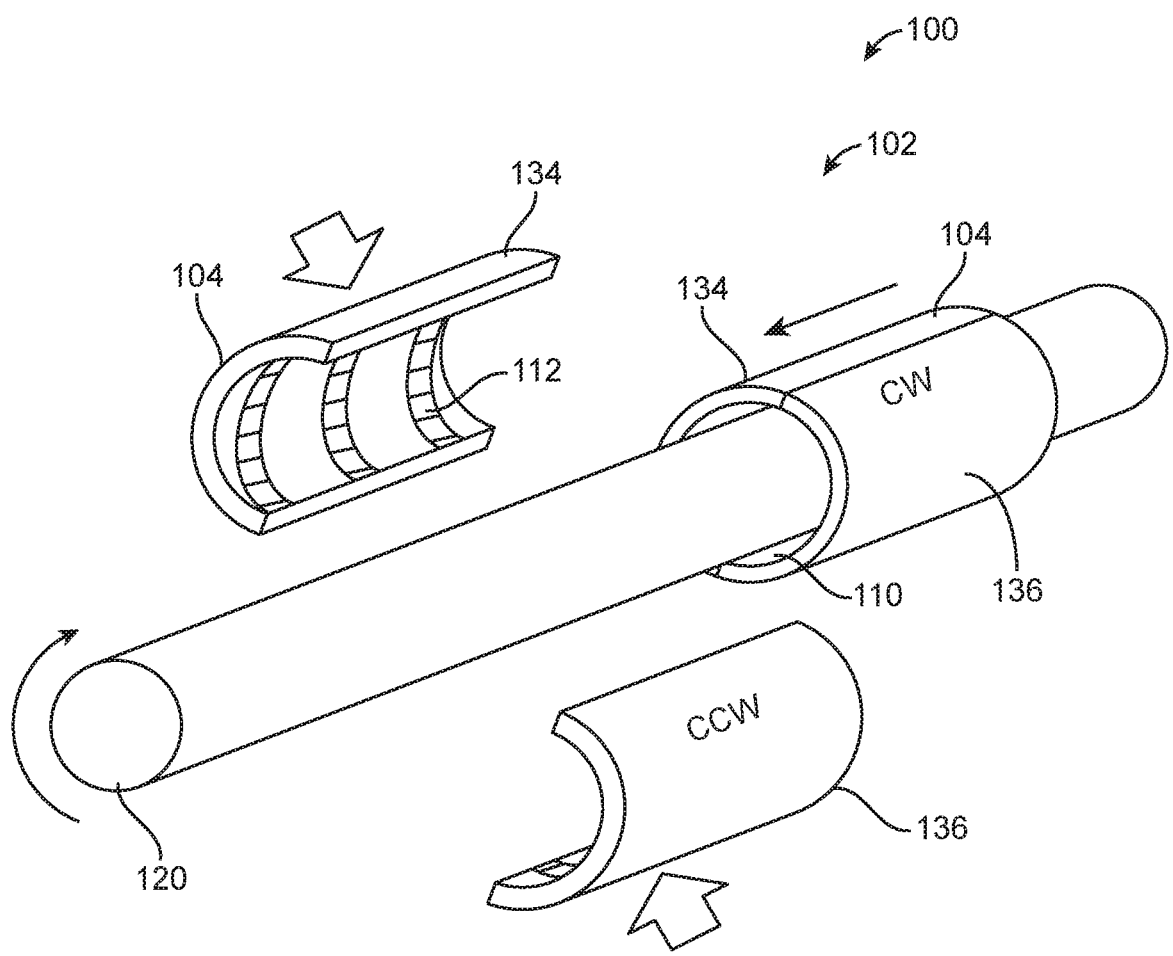
FIG. 6 is a partially exploded view isometric view of an example drive system having a two piece drive body in accordance with the present disclosure.

FIG. 6 illustrates a drive system 100 having a drive body 104 having two portions. As illustrated the two portions 134, 136 are substantially the same size and approximately one half of the drive body 104 as described above. In other examples, the two portions 134, 136 can be different sizes. For example, one of the two portions can be sized such that one is about a quarter of the overall drive body 104 and the other is about three-quarters of the overall drive body 104. The drive body 104 can also be described as two nut half pairs, a first nut half 134 and a second nut half 136. The first nut half 134 and the second nut half 136 can be couplable one to the other forming a hollow member 106. In some instances the first nut half 134 and the second nut half 136 can be substantially equal, forming two substantially equal halves.

Each of the first nut half 134 and second nut half 136 can have an inner surface 108 and a plurality of magnetic sources 112 coupled to the inner surface 108. The plurality of magnetic sources 112 can be arranged in a helix 114 relative to the inner surface of the assembled first nut half 134 and second nut half 136.

The first nut half 134 and second nut half 146 can be assembled to collectively receive the drive member 120 within the hollow member 106. The first nut half 134 and the second nut half 136 can move inward and outward relative to the drive member 120 to engage or disengage magnetic coupling with the drive member, as the first nut half 134 and the second nut half 136 move outward (away from one another) a gap can be formed therebetween. The inward and outward motion can be achieved by a biased coupling member allowing the first nut half 134 and the second nut half 136 to displace relative the other. The biasing element can be a spring, linear actuator, or other like bias able element. The first nut half 134 and the second nut half 136 can be couplable together by a hinge arrangement allowing them to pivot relative to the drive member 120 in a clam shell arrangement. In other examples, the nut half pairs can have extendible pins to displace the adjacent nut half pair, thus disengaging the magnetic coupling with the drive member 120.

As can be appreciated in FIG. 6, the drive system 100 can have two drive bodies 104, one having a first nut half 134 and a second nut half 136 having a clockwise magnetic helix orientation and a second drive body 104 having a first nut half and a second nut half 136 having a counter clockwise magnetic helix orientation. The drive bodies 104 can be selectively engageable with the drive member 120, thereby providing rapid reversal of vehicle 118, or other driven member. The drive member 120 can maintain a constant rotation and the first drive body or second drive body can engage, thereby halting and/or reversing the direction of travel of the vehicle.

Figure 7:
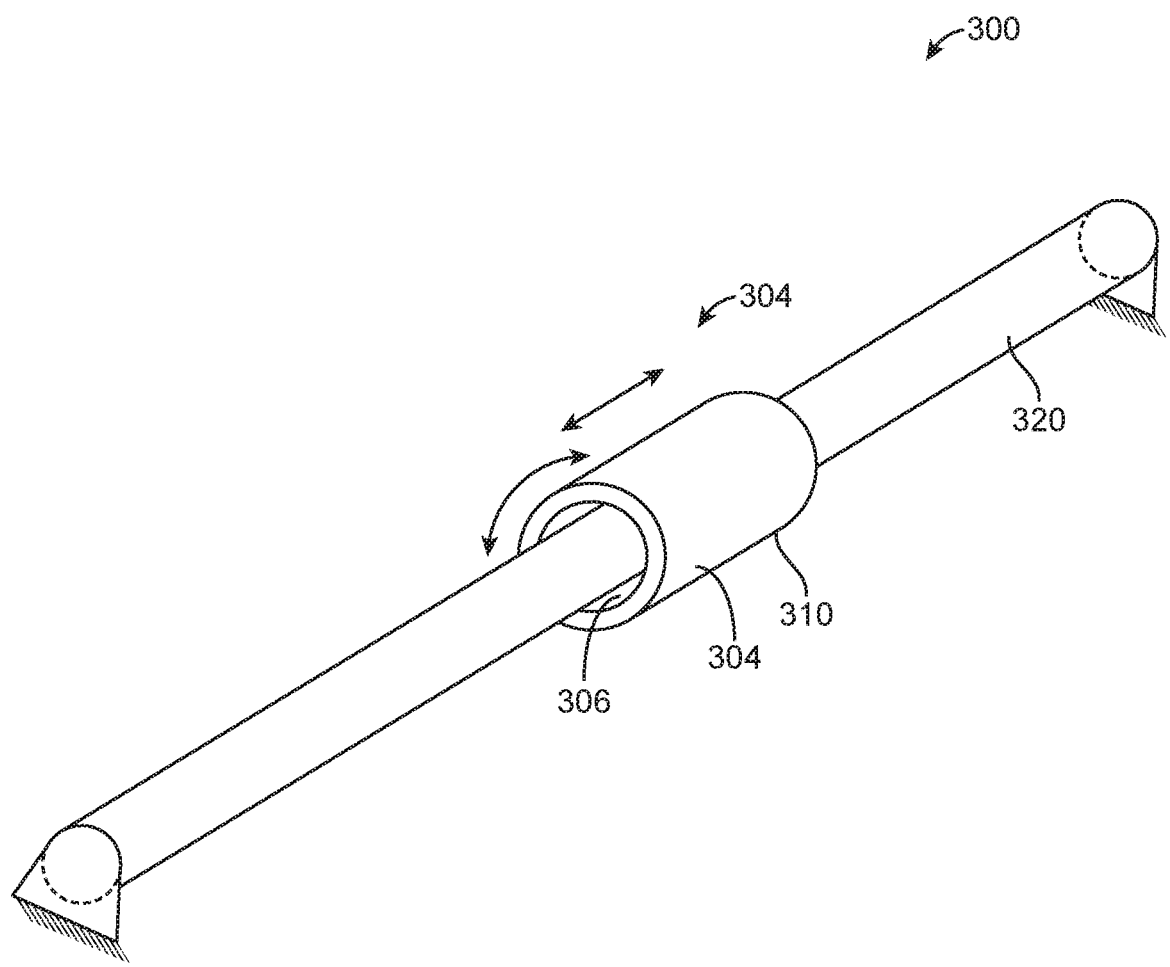
FIG. 7 is an isometric view of a second example drive system in accordance with the present disclosure.

FIG. 7 illustrates another example of a drive system 300. The drive system 300 has a drive body 304 engaged with a drive member 320. The drive body 304 is configured to receive the drive member 320 therein. The drive body 304 can have a plurality of magnetic sources 312 coupled with an inner surface 308 of the drive body 304. The plurality of magnetic sources 312 can be arranged in a helix 314 and thereby produce a helical magnetic flux. Additionally, the drive body 304 can include a hollow member 306 that is sized for the drive member 320 to pass therethrough.

The drive body 304 can be configured to rotate about the stationary drive member 320, thus imparting a motive force onto the drive body 304 along the longitudinal axis of the drive member 320. The helix 314 formed by the plurality of magnetic sources 312 can generate a motive force in a force in a first direction when the drive body 304 is rotated in a clockwise direction, and generate a motive force in a second direction opposite the first direction when the drive body 304 is rotated in a counterclockwise direction.

The stationary drive member 320 can be as described above with respect to the rotational drive member 320. The drive member 320 can be a substantially cylindrical tube configured to magnetically engage with the plurality of magnetic sources 312. In at least one example, the drive member 320 can be formed of an aluminum alloy.

The drive body 304 can have a prime mover configured to rotate the drive body 304. The prime mover can couple with the drive body 304 and allow rotation of the drive body 304. The prime mover can include one or more bearings or gears to allow independent rotation of the drive body 304. In at least one example, the prime mover is a gear arrangement engagable with an outer surface 310 of the hollow member 306 of the drive body. The drive system 300 can be include with a vehicle (not shown) to allow transportation of people or cargo along the drive member 320 through rotation of the drive body 304.

In other examples, the present technology can be implemented in other configurations. In the configuration as presented above, the helical magnetic array is configured to traverse the drive member. In this configuration, the helical magnetic array is not subjected to centripetal force. Another example, the helical magnetic array can be subject to spinning, which causes the helical magnetic array to experience centripetal force. This requires that the helical magnetic array be configured to resist that movement. In one example, presented in FIG. 8, the helical magnetic array rotates within the drive member.

Figure 8:
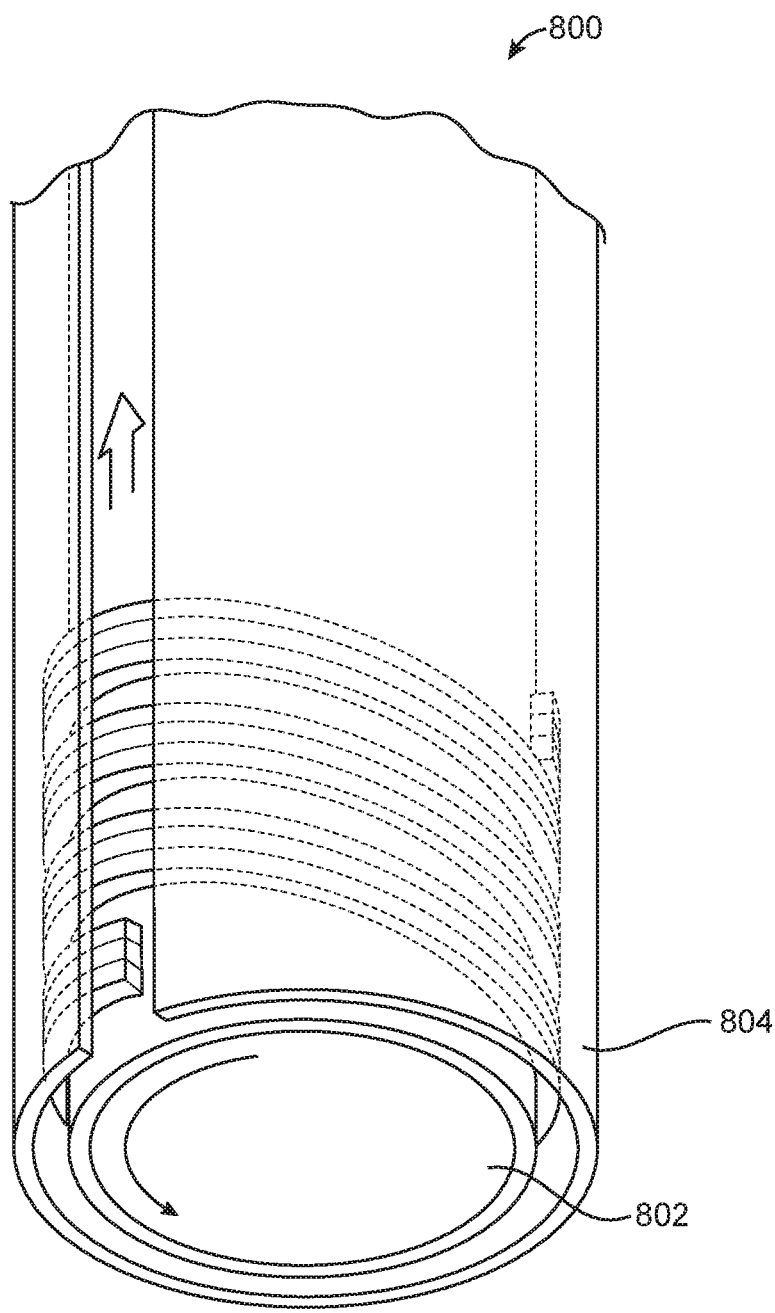
FIG. 8 is illustrates an example of a helical magnetic array propulsion system.

FIG. 8 illustrates an example of a helical magnetic array propulsion system 800. The propulsion technology is a helical magnetic array 802, or HMA. The HMA 802 is a rigid cylinder upon which spiral lines of homopolar magnetic sources are wound. The resulting screw-like (helical) magnetic array 802 when placed within a tube 804 of electrically conductive material, such as aluminum, can transfer rotary force to linear force or vice versa. As the HMA cylinder 802 turns within the tube 804, also called the reaction tube, electrical eddy currents are formed within the material of the tube and these act to produce an axial force between the cylinder and the tube. If the cylinder 802 is free to move axially, the cylinder 802 will move along inside the tube 804 at a rate determined by the rate of rotation and the degree of resistance to motion present. Likewise, if the cylinder 802 is made to move axially inside the tube 804 a rotational force between the cylinder 802 and the tube 804 occurs. A secondary force is also produced, which is a radially centering force that holds the cylinders 802 away from contact with the reaction tube 804 inner wall.

In the present HMA propulsion system 800, the reaction tube 804 has a slot running its length through which supporting arms can hold HMA cylinders 802. These arms can attach to a vehicle, bogie, or other object to be transported by the HMA propulsion system 800. The reaction tube 804 is substantially continuous along the travel direction of the track. Conventional rotary electric motors cause the HMA cylinders 802 to rotate thus providing contact free propulsion to the vehicle. When the input of electrical energy is stopped, the kinetic energy of the vehicle is imparted back to the cylinders 802 as spinning energy. The spinning cylinders 802 are still connected to the electrical motors, which can be utilized as generators to convert the kinetic energy of the moving system back into electrical energy, regeneration, in other words.

Electrical power for the rotary motors can be supplied from onboard batteries or generators, or it can be conveyed to the vehicle via cables, induction or sliding electrical contacts. It is also possible to drive the HMA cylinders 802 with some other form of rotary motor such as an internal combustion engine or a gas turbine. The HMA propulsion system 800 can achieve velocities upwards of 100 mps (223 mph). In other examples, the HMA propulsion system 800 can achieve velocities higher than 100 mps, depending on the construction and materials involved.

One of the more attractive attributes of the HMA system 800 is the simplicity of the construction of the reaction tube. In most cases it is simply a slotted aluminum tube. In at least one example, wall thickness can be between 8 and 13 millimeters (mm), and diameter can be on the order of 300 mm. Absolute straightness is not a critical factor because the air gap between the HMA 802 surface and the inner surface of the reaction tube 804 can be several millimeters. In one example, the air gap can be on the order of 5-10 mm. Likewise, surface smoothness is not critical for operation. The reaction tube can also be wet, icy, dirty or greasy without any effect on the magnetic traction of the system.

In the event of an emergency stop, the HMA cylinders 802 can exert tremendous slowing force on the vehicle. This can be accomplished by "dumping" the generated electrical energy into a resistor bank or by mechanically braking or even locking the rotating shafts.

The HMA propulsion system could also be applied to other horizontal transport systems such as large trains, material carrying hoppers, linear actuators or conveyor systems. It could also be well applied to a vertical transport system, such as an elevator. As structures have grown taller and elevators have had to serve ever longer trips the issue of elevator cables, or their elimination, has become central to the evolution of the technology. Linear induction motors, or LIMs have seen increased interest. In many ways the HMA functions like a LIM but with some significant advantages. The HMA tends to be very efficient by comparison with a LIM. Also the reaction tube of the HMA is significantly less complicated, precise and expensive compared to a LIM reaction rail. Tolerances are much greater in the case of the HMA. And the HMA has an excellent failsafe behavior in that loss of power can automatically engage shaft braking or locking mechanisms that effectively prevent elevator freefall.

It is also conceivable to design elevator systems that are not constrained to a single vertical path but rather can switch paths using guideway switching technology. In this way a cluster of elevator shafts carrying multiple cars can move more people, faster and more directly.

It is believed the examples and advantages will be understood from the foregoing description, and it will be apparent that various changes may be made thereto without departing from the spirit and scope of the disclosure or sacrificing all of its advantages, the examples hereinbefore described merely being examples of the disclosure.

What is claimed is:

1. A drive system comprising:
    at least one drive generator comprising a helical magnetic array;
    a coupling portion being coupled to the at least one drive generator and configured to be coupled to a vehicle;
    a drive member configured to be at least partially received within the at least one drive generator, whereby the drive member is magnetically coupled to the at least one drive generator; and
    a prime mover coupled to the drive member and configured to rotate the drive member relative to the at least one drive generator, thereby imparting motion, when at least a portion of the drive member is received within the at least one drive generator, of the at least one drive generator relative to the drive member,
    wherein rotation of the drive member induces a driving magnetic flux between the helical magnetic array of the at least one drive generator and the drive member,
    wherein the drive member is an electrically conductive, non-magnetic material.

2. The drive system as recited in claim 1, wherein the at least one drive generator comprises at least one drive body forming a receiving space that is configured to allow the drive member to pass therethrough.

3. The drive system as recited in claim 2, wherein the helical magnetic array comprises a plurality of magnetic sources mounted to the at least one drive body.

4. The drive system as recited in claim 3, wherein the at least one drive body has an inner surface and an outer surface, and the plurality of magnetic sources are coupled to the inner surface.

5. The drive system as recited in claim 4, wherein the plurality of magnetic sources are arranged so as to form a helix relative to the at least one drive body.

6. The drive system as recited in claim 3, wherein the at least one drive body has an inner surface and an outer surface, and the plurality of magnetic sources are coupled to the outer surface and are arranged so as to form a helix relative to the at least one drive body.

7. The drive system as recited in claim 2, wherein the at least one drive body has a plurality of magnetic sources mounted therein.

8. The drive system of claim 2, wherein the at least one drive body forms a slot running a length of the at least one drive body.

9. The drive system as recited in claim 1, wherein the helical magnetic array comprises a plurality of magnetic sources configured to produce a helical magnetic flux.

10. The drive system of claim 1, wherein the drive member has a longitudinally extending length substantially parallel to a direction of travel of the at least one drive generator, and the drive member is configured to be rotated about a longitudinal axis.

11. The drive system of claim 1, wherein the helical magnetic array comprises a plurality of magnetic sources that are arranged in a double helix, such that there are two rows of the plurality of magnetic sources.

12. The drive system of claim 11, wherein the two rows are of opposite polarity.

13. The drive system of claim 1, wherein the helical magnetic array comprises a plurality of magnetic sources that are arranged in a quadruple helix, such that there are four rows of the plurality of magnetic sources.

14. The drive system of claim 13, wherein the quadruple helix is formed by two double helix arrays.

15. The drive system of claim 13, wherein adjacent rows of the four rows of the plurality of magnetic sources are of opposite polarity.

16. A drive generator configured to provide motive force to a vehicle, the drive generator comprising:
    a helical magnetic array configured to emit a helical magnetic flux towards a drive member, which is configured to be received within the helical magnetic array;
    a coupling portion configured to couple the vehicle with one of the drive generator or the drive member;
    wherein, upon rotation of either the drive member or helical magnetic array, drive generator is configured to traverse the drive member based upon a rotation direction and a speed of the rotation,
    wherein rotation of either the drive member or the helical magnetic array induces the helical magnetic flux to a driving magnetic flux between the helical magnetic array and the drive member,
    wherein the drive member is an electrically conductive, non-magnetic material.

17. The drive generator of claim 16, further comprising a drive body wherein the drive body is formed by two portions.

18. The drive generator of claim 17, wherein the two portions are two substantially equal halves.

19. The drive generator of claim 18, wherein the two substantially equal halves are movably coupled one to the other, allowing variation of a gap formed between the inner surface of the drive body and the drive member.

20. A drive system comprising:
    a drive generator comprising at least one drive body comprising a helical magnetic array;
    a coupling portion being coupled to the at least one drive body and a vehicle;
    a drive member, wherein at least a portion of the drive member is configured to fit within the at least one drive body; and
    a prime mover is coupled to the at least one drive body and configured to rotate the at least one drive body relative to the drive member, thereby imparting motion, when a portion of the drive member is located within the at least one drive body, of the at least one drive body relative to the drive member, wherein rotation of the at least one drive body induces a driving magnetic flux between the helical magnetic array and the drive member, wherein the drive member is an electrically conductive, non-magnetic material.

\* \* \* \* \*